(12) United States Patent
Haag et al.

(10) Patent No.: US 12,072,519 B2
(45) Date of Patent: Aug. 27, 2024

(54) MULTILAYER OPTICAL FILM

(71) Applicant: 3M INNOVATIVE PROPERTIES COMPANY, St. Paul, MN (US)

(72) Inventors: Adam D. Haag, Woodbury, MN (US); William B. Black, Eagan, MN (US); Robert M. Biegler, Woodbury, MN (US); Matthew B. Johnson, Woodbury, MN (US); Edward J. Kivel, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 307 days.

(21) Appl. No.: 17/605,683

(22) PCT Filed: May 20, 2020

(86) PCT No.: PCT/IB2020/054798
§ 371 (c)(1),
(2) Date: Oct. 22, 2021

(87) PCT Pub. No.: WO2020/234808
PCT Pub. Date: Nov. 26, 2020

(65) Prior Publication Data
US 2022/0163713 A1   May 26, 2022

Related U.S. Application Data

(60) Provisional application No. 62/852,112, filed on May 23, 2019.

(51) Int. Cl.
*G02B 5/30* (2006.01)
*B32B 7/02* (2019.01)

(52) U.S. Cl.
CPC ............... *G02B 5/305* (2013.01); *B32B 7/02* (2013.01); *G02B 5/3083* (2013.01)

(58) Field of Classification Search
CPC ............ G02B 1/00–1/14; G02B 5/305; B32B 7/00–7/14
See application file for complete search history.

(56) References Cited

U.S. PATENT DOCUMENTS 3,610,729 A   10/1971   Rogers
4,446,305 A    5/1984   Rogers
(Continued)

FOREIGN PATENT DOCUMENTS

EP   2239136 A1   10/2010
EP   3486697      5/2019
(Continued)

OTHER PUBLICATIONS

Born, Principles of Optics: Electromagnetic Theory of Propagation, Interference and Diffraction of Light, 1980, 32 pages.
(Continued)

*Primary Examiner* — Prashant J Khatri
(74) *Attorney, Agent, or Firm* — Clifton F. Richardson

(57) ABSTRACT

A multilayer optical film includes a plurality of polymeric layers arranged sequentially adjacent to each other. A difference in thickness between spaced apart first and second polymeric layers in the plurality of polymeric layers is less than about 10%. Each polymeric layer that is disposed between the first and second polymeric layers has a thickness less than about 400 nm. Each layer in a group of at least three polymeric layers in the plurality of polymeric layers that are disposed between the first and second polymeric layers has a thickness greater than an average thickness of the first and second polymeric layers by about 20% to about 500%. The group of at least three polymeric layers includes at least one pair of immediately adjacent polymeric layers.

15 Claims, 16 Drawing Sheets

(56) References Cited

U.S. PATENT DOCUMENTS

| | | | |
|---|---|---|---|
| 4,540,623 | A | 9/1985 | Im |
| 5,448,404 | A | 9/1995 | Schrenk |
| 5,882,774 | A | 3/1999 | Jonza |
| 6,157,490 | A | 12/2000 | Wheatley |
| 6,783,349 | B2 | 8/2004 | Neavin |
| 6,916,440 | B2 | 7/2005 | Jackson |
| 9,279,921 | B2 | 3/2016 | Kivel |
| 2010/0254002 | A1 | 10/2010 | Merrill |
| 2010/0330350 | A1 | 12/2010 | Osada |
| 2014/0127485 | A1 | 5/2014 | Uto |
| 2014/0307205 | A1* | 10/2014 | Banerjee .............. G02B 5/3083 349/65 |
| 2016/0216427 | A1 | 7/2016 | Johnson |

FOREIGN PATENT DOCUMENTS

| | | |
|---|---|---|
| WO | WO 1999-036809 | 7/1999 |
| WO | WO 2014-099367 | 6/2014 |
| WO | WO 2018-163009 | 9/2018 |
| WO | 2019069214 A2 | 4/2019 |
| WO | WO 2019-073330 | 4/2019 |
| WO | WO 2019-077547 | 4/2019 |
| WO | WO 2020-234801 | 11/2020 |

OTHER PUBLICATIONS

International Search Report for PCT International Application No. PCT/IB2020/054798, mailed on Aug. 4, 2020, 4 pages.

* cited by examiner

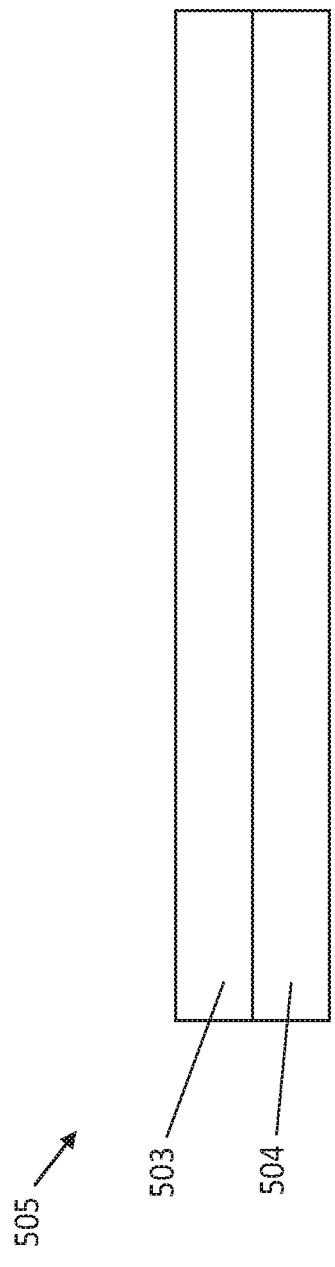
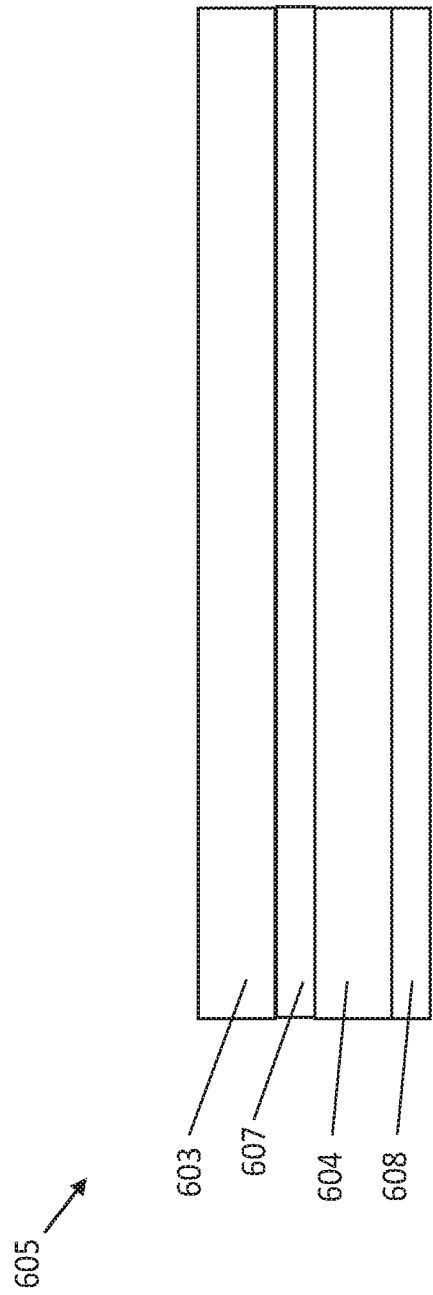

MULTILAYER OPTICAL FILM

CROSS REFERENCE TO RELATED APPLICATIONS

This application is a national stage filing under 35 U.S.C. 371 of PCT/IB2020/054798, filed May 20, 2020, which claims the benefit of Provisional Application No. 62/852,112, filed May 23, 2019, the disclosures of which are incorporated by reference in their entirety herein.

BACKGROUND

Multilayer optical films may include packets of microlayers separated by optically thick protective boundary layers.

SUMMARY

In some aspects of the present description, a multilayer optical film including a plurality of polymeric layers arranged sequentially adjacent to each other is provided. A difference in thickness between spaced apart first and second polymeric layers in the plurality of polymeric layers is less than about 10%. Each polymeric layer disposed between the first and second polymeric layers has a thickness less than about 400 nm. Each layer in a group of at least three polymeric layers in the plurality of polymeric layers that are disposed between the first and second polymeric layers has a thickness greater than an average thickness of the first and second polymeric layers by about 20% to about 500%. The group of at least three polymeric layers includes at least one pair of immediately adjacent polymeric layers.

In some aspects of the present description, a multilayer optical film including a plurality of optical repeat units arranged sequentially adjacent to each other along at least a portion of a thickness of the multilayer optical film is provided. Each optical repeat unit includes at least two layers and has a corresponding bandwidth. The bandwidths of spaced apart first and second optical repeat units in the plurality of optical repeat units overlap each other. At least a pair of adjacent optical repeat units in the plurality of optical repeat units that are disposed between the first and second optical repeat units have non-overlapping bandwidths. No optical repeat unit disposed between the first and second optical repeat units has a thickness less than an average thickness of the first and second optical repeat units by more than about 10%. Each layer in the multilayer optical film disposed between the first and second optical repeat units has an average thickness less than about 400 nm.

In some aspects of the present description, a multilayer optical film including a plurality of alternating layers of first and second polymeric layers arranged sequentially adjacent to each other is provided. At least first through fourth sequentially arranged adjacent layers in the plurality of alternating layers of the first and second polymeric layers have intended average thicknesses t1 through t4, respectively. Each of t1 through t4 is less than about 400 nm. One of t2 and t3 is greater than t1, t4 and the other one of t2 and t3 by at least 5%.

In some aspects of the present description, a multilayer optical film including a first multilayer stack, a second multilayer stack, and a third multilayer stack disposed therebetween is provided. Each of the first, second, and third multilayer stacks includes a plurality of polymeric layers. A total number of polymeric layers in each of the first and second multilayer stacks is at least 50. The first and second multilayer stacks include respective first and second polymer layers immediately adjacent the third multilayer stack, where a difference in thickness between the first and second polymeric layers is less than about 10%. The third multilayer stack includes at least one pair of immediately adjacent polymeric layers such that each polymeric layer in the at least one pair has a thickness greater than an average thickness of the first and second polymeric layers by at least about 20%. The multilayer optical film is integrally formed and a minimum average peel force between first and second portions of the multilayer optical film is greater than about 0.4 N/cm, where the first and second portions include at least one polymeric layer of the first and second multilayer stacks, respectively.

BRIEF DESCRIPTION OF THE DRAWINGS

FIG. 5 is a schematic cross-sectional view of an optical repeat unit including two layers;

FIG. 6 is a schematic cross-sectional view of an optical repeat unit including four layers;

DETAILED DESCRIPTION

Figure 1:
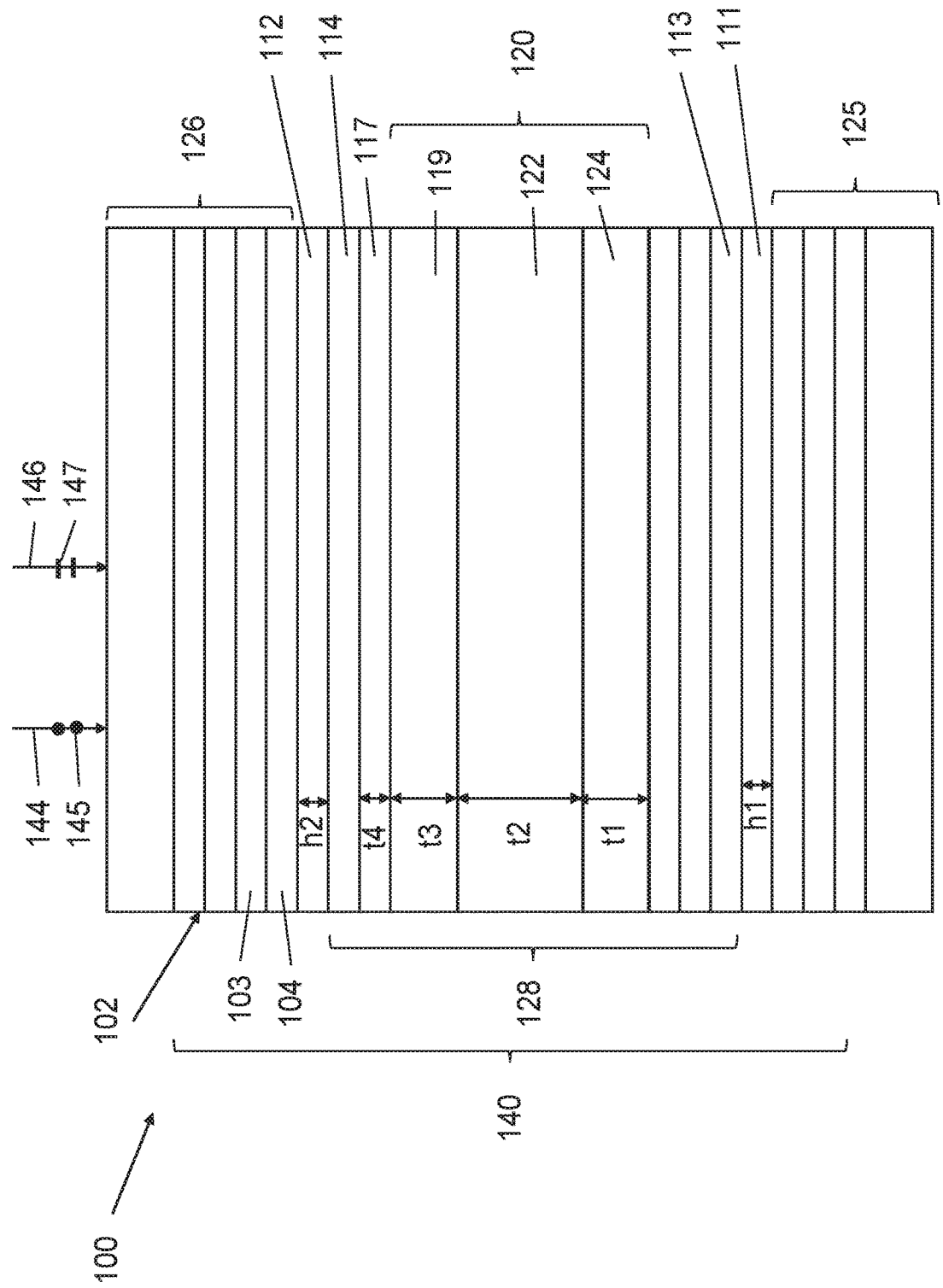
FIG. 1 is a schematic cross-sectional view of a multilayer optical film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films that provide desirable transmission and/or reflection properties at least partially by an arrangement of microlayers of differing refractive index, are known. Such optical films have been demonstrated, for example, by coextrusion of alternating polymer layers, casting the layers through a film die onto a chill roll, and then stretching the cast web. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), U.S. Pat. No. 5,882,774 (Jonza et al.), U.S. Pat. No. 6,157,490 (Wheatley et al.), U.S. Pat. No. 6,783,349 (Neavin et al.), and U.S. Pat. No. 9,279,921 (Kivel et al.), and International Appl. Pub. No. 2018/163009 (Haag et al.). In these polymeric multilayer optical films, polymer materials may be used predominantly or exclusively in the makeup of the individual layers. Such films are compatible with high volume manufacturing processes and can be made in large sheets and roll goods. By selecting suitable microlayers and suitable arrangement (e.g., thickness profile) of the microlayers, the multilayer optical film can be configured to be a broadband (e.g., a visible and/or near infrared wavelength range) reflective polarizer, a broadband mirror, a notch (e.g., having relatively narrow spaced apart reflection bands) reflective polarizer, or a notch mirror, for example.

In some cases, a multilayer optical film includes two or more optical stacks or optical packets of optical repeat units. An optical repeat unit includes two or more layers and is repeated across a stack or packet of the optical repeat units. An optical repeat unit has a first order reflection for a wavelength twice the optical thickness (thickness times refractive index) of the optical repeat unit. Each layer in a packet of optical repeat units may have a thickness less than 400 nm, or less than 300 nm, or less than 250 nm, or less than 200 nm. Each layer may have a thickness greater than about 5 nm or greater than about 10 nm. A multilayer optical film may include two packets of optical repeat units, where one packet is configured to reflect blue to green wavelengths and the other packet is configured to reflect green to red wavelengths, for example. One or more spacer layers may be included between the packets of optical repeat units. Conventionally, one or two optically thick (too thick to substantially contribute to a first order visible (e.g., wavelengths in a range of about 400 nm to about 700 nm) or near infrared (e.g., wavelengths in a range of about 700 nm to about 2500 nm) light reflection by optical interference) spacer layers or protective boundary layers (PBLs) have been included. These PBL layers are typically included to prevent flow profiles in the coextruded web of alternating polymer layers from producing optical defects in the alternating polymer layers. According to the present description, it has been found that using thinner PBLs can provide improved resistance against delamination of adjacent optical packets, but that thinner PBLs can also result in optical defects. According to some embodiments of the present description, it has been found that using a larger number of thinner PBLs provides improved delamination resistance between optical packets without resulting in optical defects. According to some embodiments, these thinner PBLs are preferably less than about 400 nm thick. In some embodiments, three or more PBL layers are included between adjacent packets of optical repeat units. In some embodiments, at least some, and in some cases, all, of these PBL layers are optical layers. An optical layer in this context is a layer having a thickness in a range that that the layer can significantly contribute to first order visible or near infrared light reflection by optical interference. In some embodiments, the thickness profiles of the PBLs are chosen to prevent or reduce optical coherence from such reflections (e.g., different optical repeat units in the PBLs may have non-overlapping bandwidths) so that the PBLs do not substantially affect the reflectance of the multilayer optical film.

FIG. 1 is a schematic cross-sectional view of a multilayer optical film 100. The optical film 100 includes a plurality of polymeric layers 102 arranged sequentially adjacent to each other. A difference in thickness between spaced apart first and second polymeric layers 111 and 112 in the plurality of polymeric layers less than about 10%, or less than about 7%, or less than about 5%. The percent difference in thickness of the first and second layers 111 and 112 is |h1−h2| divided by the larger of h1 and h2 times 100% where h1 is the thickness of first layer 111 and h2 is the thickness of second layer 112. In some embodiments, each layer in a group 120 of at least three polymeric layers in the plurality of polymeric layers 102 that are disposed between the first and second polymeric layers 111 and 112 have a thickness (e.g., t1, t2, t3) greater than an average thickness ((h1+h2)/2) of the first and second polymeric layers by about 20% to about 500%. In some such embodiments, each layer in the group 120 has a thickness that is greater than the average thickness of the first and second polymeric layers by at least about 30%, or at least about 50%, or at least about 100%, or at least about 150%. In some such embodiments or in other embodiments, each layer in the group 120 has a thickness that is greater than the average thickness of the first and second polymeric layers by no more than about 400%, or no more than about 300%, or no more than about 250%. In some embodiments, the group 120 of at least three polymeric layers has an average thickness (e.g., (t1+t2+t3)/3 in the illustrated embodiment) that is greater than the average thickness of the first and second polymeric layers 111 and 112 by about 50% to about 400%, or about 100% to about 300%, or about 150% to about 250%.

Typically, each layer in a multilayer optical film has a constant or approximately constant thickness. If there is a variation in the thickness of a layer in a multilayer optical film, the thickness of the layer refers to an average (unweighted mean) thickness of the layer, unless indicated differently. The average thickness of a set or group of layers is the arithmetic mean of the thicknesses of the individual layers in the set or group. The intended average thickness of a layer is a design or nominal thickness of the layer. In some embodiments, the intended average thickness of a layer is the same or substantially the same as the average thickness of the layer.

In some embodiments, the group 120 of at least three polymeric layers includes at least one pair of immediately adjacent polymeric layers (e.g., 124 and 122, or 122 and 119). In some embodiments, the polymeric layers in the group 120 of at least three polymeric layers are arranged sequentially adjacent to each other as schematically illustrated in FIG. 1. In other embodiments, the additional polymeric layer(s) may separate some of the polymeric layers in the group 120.

The optical film 100 may include many more layers than schematically illustrated in FIG. 1. In some embodiments, the multilayer optical film 100 includes at least 50 layers, or at least 100 layers, or at least 200 layers. In some such embodiments or in other embodiments, the multilayer optical film 100 includes no more than 1000 layers, or no more than 800 layers.

The polymeric layers 128 are the polymeric layers in the plurality of polymeric layers that are disposed between the first and second polymeric layers 111 and 112. In some embodiments, a total number of polymeric layers 128 in the plurality of polymeric layers that are disposed between the first and second polymeric layers 111 and 112 is at least 3, or at least 4, or at least 5. In some embodiments, a total number of polymeric layers 128 in the plurality of polymeric layers that are disposed between the first and second polymeric layers 111 and 112 is no more than 30, or no more than 25, or no more than 20, or no more than 15, or no more than 12, or no more than 10.

As described further elsewhere, the multilayer optical film 100 may have desired optical transmittances and reflectances for substantially normally incident light 144 (e.g., light normally incident or light incident within 30 degrees, or within 20 degrees, or within 10 degrees of normal) having a first polarization state 145 and for substantially normally incident light 146 having a second polarization state 147.

Figure 2A:
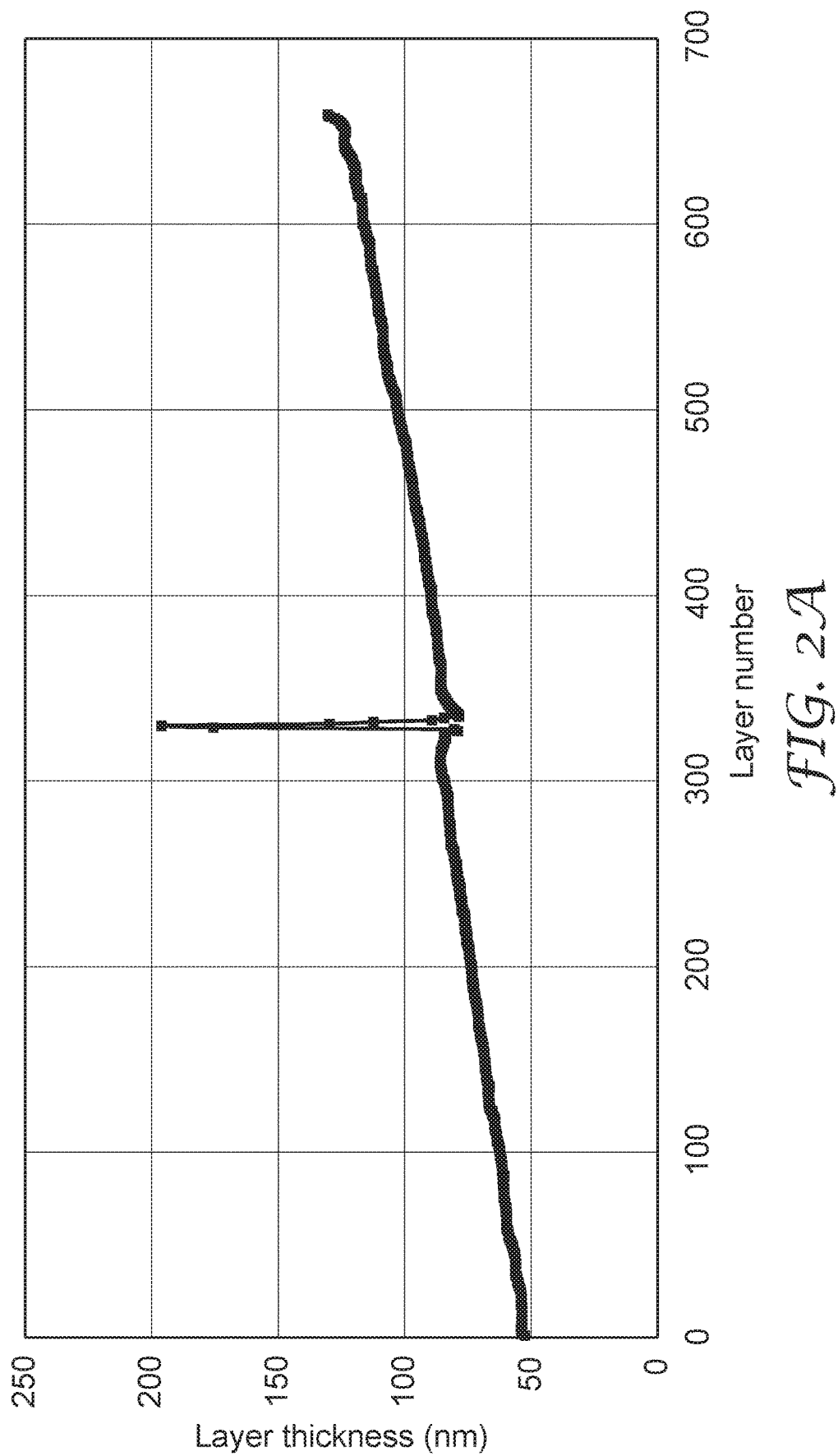
FIG. 2A is a plot of layer thickness versus layer number for a multilayer optical film.
Figure 2B:
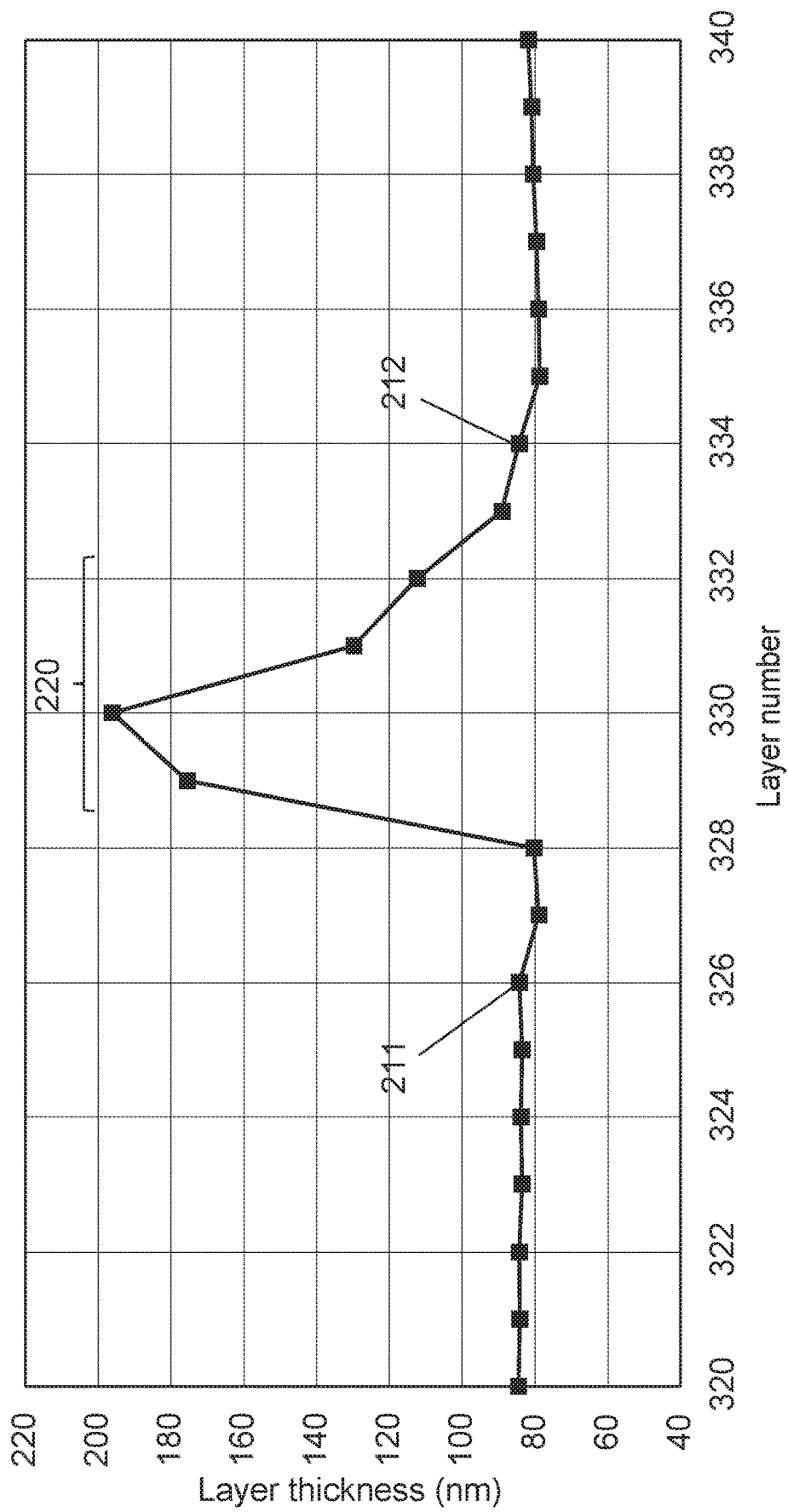
FIG. 2B is an expanded view of a portion of the plot of FIG. 2A.

FIG. 2A is a plot of layer thickness versus layer number for a multilayer optical film that may correspond to multilayer optical film 100. FIG. 2B is a portion of the plot of FIG. 2A illustrating spaced apart first and second polymeric layers 211 and 212 and a group 220 of at least three polymeric layers disposed between the first and second polymeric layers 211 and 212. Data points at integer layer numbers are shown. The lines between the data points are a guide to the eye. First layer 211 has a thickness of 84.3 nm, second layer 212 a thickness of 84.4 nm, and the layers in the group 220 have thickness of 175.5 nm, 196.2 nm, 129.8 nm, and 112.3 nm, respectively. Each layer in the group 220 had a thickness greater than an average thickness of the first and second layers 211 and 212 by about 33% to about 133% (e.g., (112.3 nm−84.35 nm)/84.35 nm times 100% is about 33%).

In some embodiments, the group 120 or 220 of at least three polymeric layers in the plurality of polymeric layers is a group of at least four polymeric layers in the plurality of polymeric layers. In some embodiments, the group of at least three polymeric layers includes less than 20 polymeric layers, or less than 15 polymeric layers, or less than 10 polymeric layers.

In some embodiments, each of the first and second polymeric layers 111 and 112, or 211 and 212, is disposed between the group 120 or 220 of at least three polymeric layers and at least 50 other polymeric layers in the plurality of polymeric layers. For example, the groups of layers 125 and 126 schematically illustrated in FIG. 1 may each include at least 50 layers.

In some embodiments, each layer disposed between the first and second polymeric layers 111 and 112, or 211 and 212, has a thickness (e.g., average thickness of the layer) less than about 1 micron, or less than about 700 nm, or preferably less than about 500 nm, or more preferably less than about 400 nm, or even more preferably less than about 300 nm or less than about 250 nm.

In some embodiments, no layer disposed between the first and second polymeric layers 111 and 112, or 211 and 212, has a thickness (e.g., average thickness of the layer) that is less than the average thickness of the first and second polymeric layers by more than about 10%, or by more than about 5%. In other words, in some embodiments, no layer disposed between the first and second polymeric layers 111 and 112, or 211 and 212, has a thickness less than about 0.9, or less than about 0.95, times the average thickness of the first and second polymeric layers.

In some embodiments, the multilayer optical film 100 includes a first group 140 of polymeric layers arranged sequentially adjacent to each other along at least a portion of a thickness of the multilayer optical film 100. In some embodiments, the first group 140 includes at least 200 polymeric layers (fewer layers are shown in the schematic illustration of FIG. 1) arranged sequentially adjacent to each other along at least a portion of a thickness of the multilayer optical film 100. For example, the first group 140 may correspond to a group of layers of FIG. 2A-2B including at least layer numbers 200 to 400. The first group 140 of polymeric layers includes the first and second polymeric layers 111 and 112 and the group 120 of at least three polymeric layers. Each layer in the first group 140 of at least 200 polymeric layers has a thickness (e.g., average thickness of the layer) less than about 1 micron, or less than about 700 nm, or preferably less than about 500 nm, or more preferably less than about 400 nm, or even more preferably less than about 300 nm or less than about 250 nm.

Figure 3:
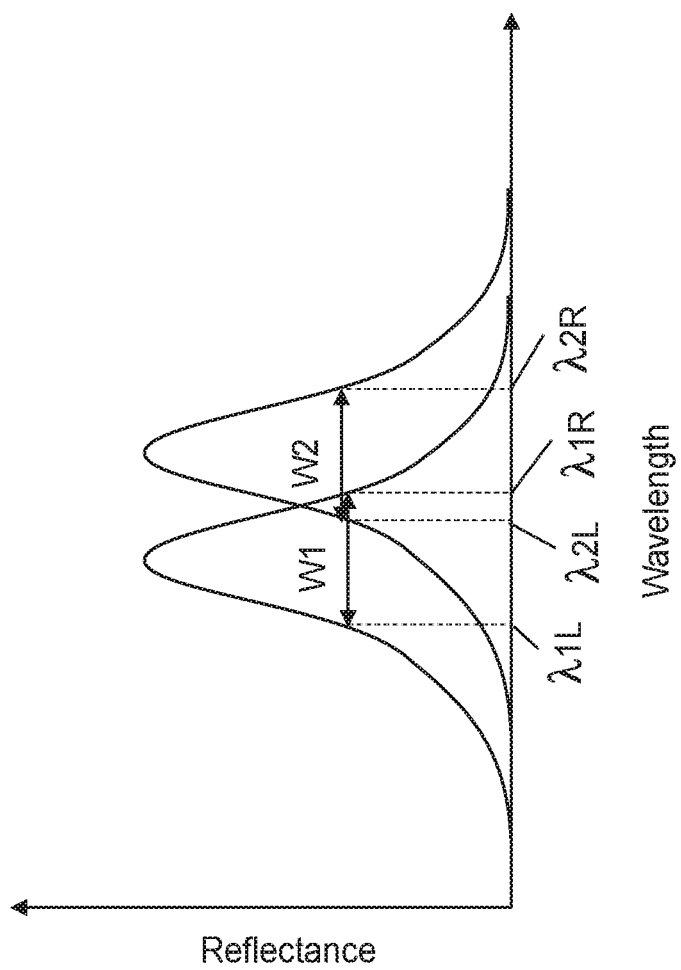
FIG. 3 is a schematic illustration of overlapping bandwidths of optical repeat units.
Figure 4:
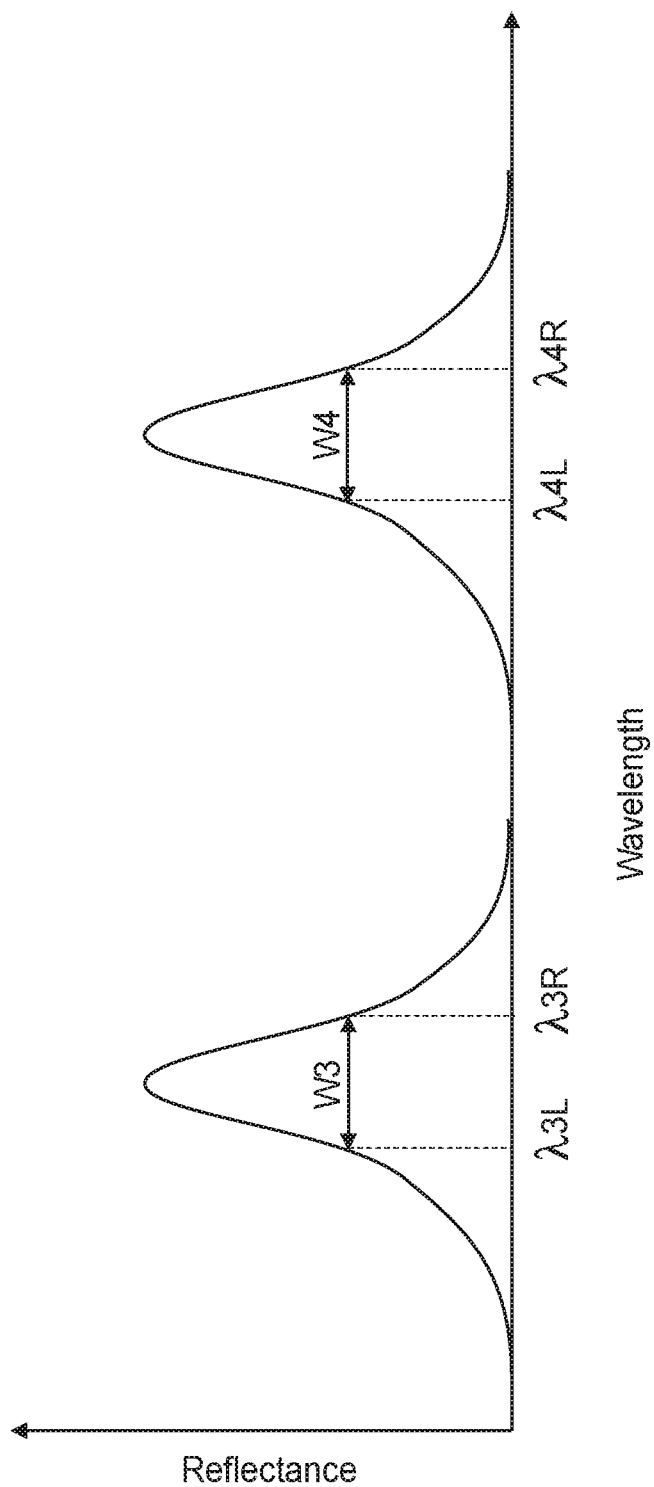
FIG. 4 is a schematic illustration of non-overlapping bandwidths of optical repeat units.

In some embodiments, a multilayer optical film 100 includes a plurality of optical repeat units (e.g., layer pairs 103, 104) arranged sequentially adjacent to each other along at least a portion of a thickness of the multilayer optical film 100. Each optical repeat unit includes at least two layers 103 and 104 and has a corresponding bandwidth. For example, a first optical repeat unit 111, 113 may have a bandwidth W1 between left and right wavelengths $\lambda 1L$ and $\lambda 1R$ and a second optical repeat unit 112, 114 may have a bandwidth W2 between left and right wavelengths $\lambda 2L$ and $\lambda 2R$ as schematically illustrated in FIG. 3. The left and right wavelengths can be understood to be the full-width at half maximum (FWHM) band edge wavelengths. In some embodiments, the bandwidths of spaced apart first and second optical repeat units 111, 113 and 112, 114 in the plurality of optical repeat units overlap each other. For example, $\lambda 2L$ is between $\lambda 1L$ and $\lambda 1R$, and $\lambda 1R$ is between $\lambda 2L$ and $\lambda 2R$. In some embodiments, at least a pair of adjacent optical repeat units (e.g., 124, 122 and 119, 117) in the plurality of optical repeat units that are disposed between the first and second optical repeat units 111, 113 and 112, 114 have non-overlapping bandwidths. This is schematically illustrated in FIG. 4 which shows a bandwidth W3 between $\lambda 3L$ and $\lambda 3R$ for an optical repeat unit (e.g., 124, 122) and a bandwidth W4 between $\lambda 4L$ and $\lambda 4R$ for an adjacent optical repeat unit (e.g., 119, 117). The bandwidths are non-overlapping since there is no overlap in the range $\lambda 3L$ and $\lambda 3R$ and the range $\lambda 4L$ and $\lambda 4R$. In some embodiments, no optical repeat unit disposed between the first and second optical repeat units has a thickness less than an average thickness of the first and second optical repeat units by more than about 10%, or by more than about 5%. The thickness of an optical repeat unit is the total thickness of the at least two layers in the optical repeat unit. In some embodiments, each layer in the multilayer optical film that is disposed between the first and second optical repeat units has a thickness (e.g., average thickness of the layer) less than less than about 1 micron, or less than about 700 nm, or preferably less than about 500 nm, or more preferably less than about 400 nm, or even more preferably less than about 300 nm or less than about 250 nm.

The bandwidth of an optical repeat unit (ORU) is the bandwidth of a first order reflection band that an infinite stack of ORU's of identical thickness would exhibit. This is readily calculated from the matrix elements of the characteristic matrix M as defined by Born and Wolf, "Principles of Optics", Edition 5, page 67.

The optical repeat unit may include two layers or may include more than two layers. For example, in some embodiments, each optical repeat unit includes at least three layers, or at least four layers. FIG. 5 is a schematic cross-sectional view of an optical repeat unit 505 including two layers 503 and 504. In some embodiments, each of the layers 503 and 504 have an optical thickness of a quarter of substantially a same wavelength. In some embodiments, one or both of the layers 503 and 504 is replaced with two (or more) layers. In some embodiments, the two (or more) layers have a combined optical thickness of a quarter of a wavelength that the optical repeat unit is configured to reflect.

FIG. 6 is a schematic cross-sectional view of an optical repeat unit 605 including four layers 603, 607, 604, 608. In some embodiments, layers 607 and 608 are tie layers included to improve bonding to adjacent layers. In some embodiments, the layers 607 and 608 have a thickness in a range of about 5 nm to about 50 nm, or about 10 nm to about 30 nm, for example. In some embodiments, the layers 607 and 608 have a same composition. In some embodiment, each optical repeat unit 605 includes layers A (603), B (607 or 608), and C (604) arranged in an order ABCB. In some such embodiments, layers AB and CB have an optical thickness of a quarter of substantially a same wavelength.

In some embodiments, a multilayer optical film 100 includes a plurality of alternating layers of first and second polymeric layers 103 and 104 arranged sequentially adjacent to each other. At least first through fourth sequentially arranged adjacent layers (e.g., layers 124, 122, 119, and 117, respectively) in the plurality of alternating layers of the first and second polymeric layers 103 and 104 have intended average thicknesses t1 through t4, respectively, where one of t2 and t3 is greater than t1, t4 and the other one of t2 and t3 by at least 5%, or by at least 7%, or by at least 10%, or by at least 15%, or at least 20%, or at least 30%. In some embodiments, one of t2 and t3 is greater than t1, t4 and the other one of t2 and t3 by about 5% to about 500%; or about 10% to about 500%; or about 20% to about 500%, or to about 400%, or to about 300%, or to about 250%. In some embodiments, each of t1 through t4 is less than about 1 micron, or less than about 700 nm, or preferably less than about 500 nm, or more preferably less than about 400 nm, or even more preferably less than about 300 nm or less than about 250 nm.

Figure 7:
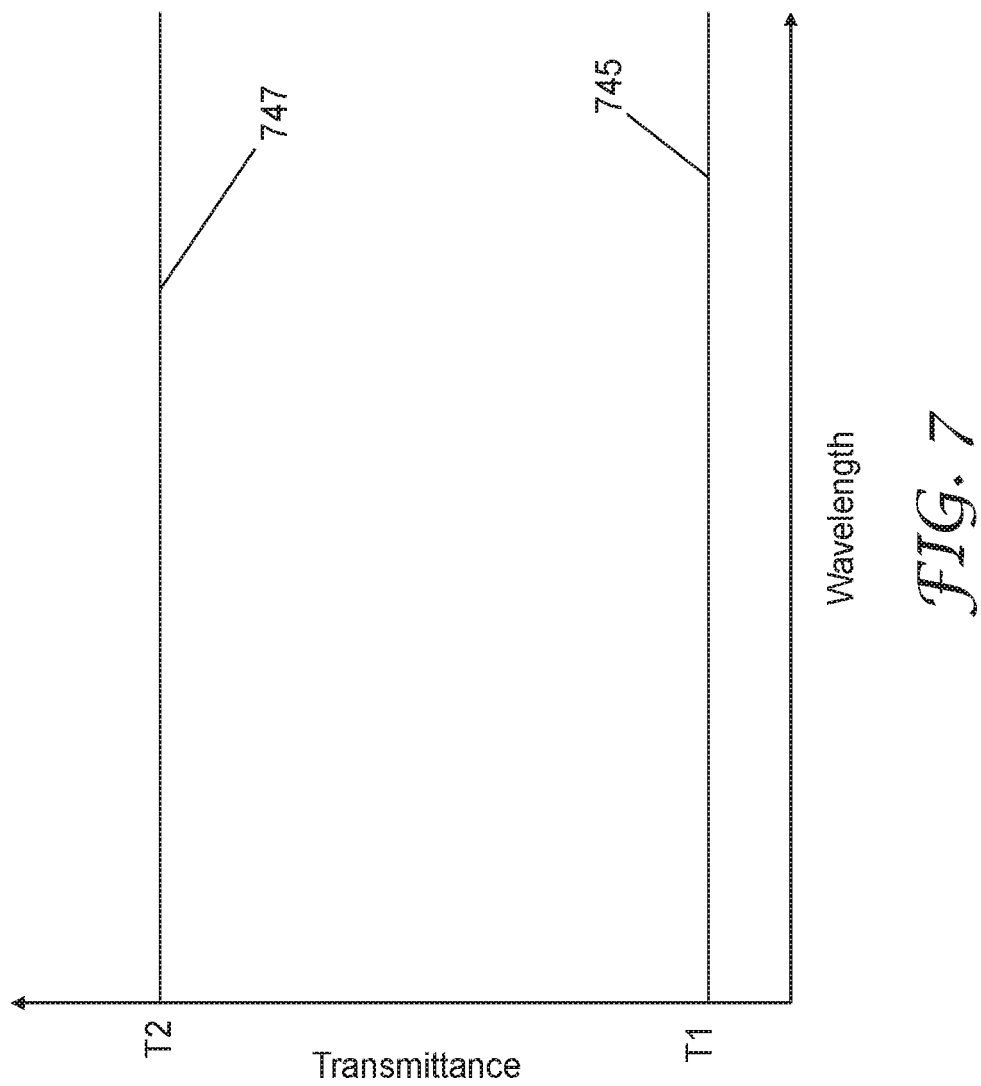
FIGS. 7-8 are schematic plots of transmittance versus wavelengths for multilayer optical films.

In some embodiments, the multilayer optical film 100 is a reflective polarizer. FIG. 7 is a schematic plot of the transmittance of an optical film versus wavelength for substantially normally incident for first and second polarizations states 745 and 747. The wavelength range depicted in FIG. 7 may be at least 200 nm wide (e.g., at least from 450 nm to 650 nm, or from 400 nm to 700 nm). In some embodiments, for substantially normally incident light in a wavelength range of at least 200 nm, the multilayer optical film 100 has an average optical reflectance of at least 60% for a first polarization state 745 and an average optical transmittance T2 of at least 60% for an orthogonal second polarization state 747. Often, the optical absorption is negligible so that the average optical reflectance is about 100% minus T1.

In some embodiments, at least some of the polymeric layers (e.g., one of two alternating polymeric layers) are substantially uniaxially oriented. For example, in some embodiments, the multilayer optical film is a reflective polarizer that is a substantially uniaxially drawn film and has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.), for example.

In some embodiments, the multilayer optical film 100 is a mirror film. In some embodiments, for substantially normally incident light in a wavelength range of at least 200 nm, the multilayer optical film 100 has an average optical reflectance of at least 60% for each of mutually orthogonal first and second polarization states. For example, the transmittance for the first and second polarization states may each follow the curve labeled 747 in FIG. 7.

The transmittance may be significantly different from the schematic illustration of FIG. 7. For example, the transmittance may vary with wavelength rather than being constant or substantially constant over a wavelength range.

Figure 8:
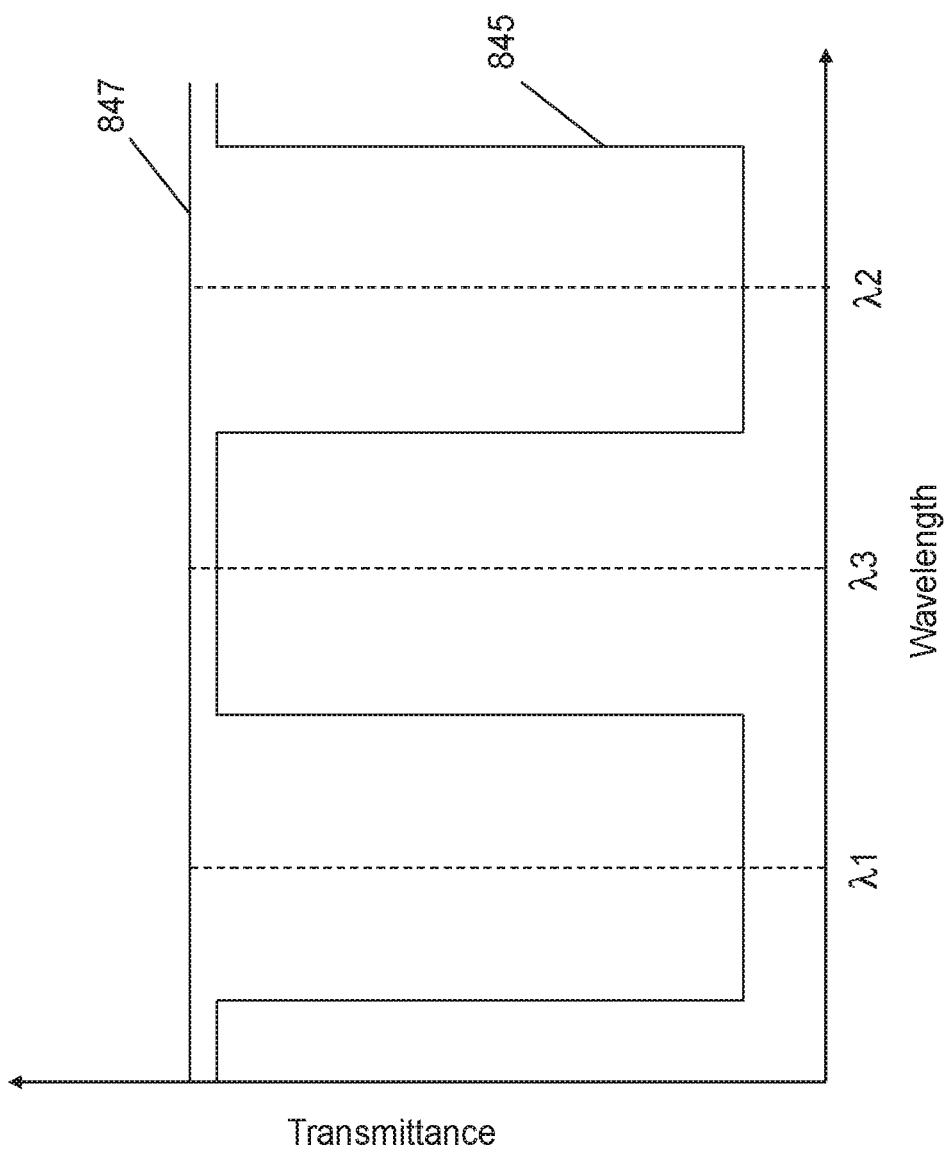

In some embodiments, the multilayer optical film 100 is a reflective polarizer having spaced apart reflection bands. FIG. 8 is a schematic plot of the transmittance of an optical film versus wavelength for substantially normally incident for first and second polarizations states 845 and 847. In some embodiments, for substantially normally incident light and for each of first and second wavelengths $\lambda 1$ and $\lambda 2$, the multilayer optical film 100 reflects at least 60% of the incident light having a first polarization state 845 and transmits at least 60% of the incident light having an orthogonal second polarization state 847. For at least a third wavelength $\lambda 3$ disposed between the first and second wavelengths $\lambda 1$ and $\lambda 2$, the multilayer optical film 100 transmits at least 60% of the incident light for each of the first and second polarization states 845 and 847.

The transmittance may be significantly different from the schematic illustration of FIG. 8. For example, the transmittance or reflectance in the reflection bands near $\lambda 1$ and $\lambda 2$ may vary within the bands and may have more gradual band edge transitions. As another example, the transmittance or reflectance may be significantly different for the reflection band near $\lambda 1$ and the reflection band near $\lambda 2$.

The multilayer optical films of the present description may be integrally formed. As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film which is then oriented) rather than manufactured separately and then subsequently joined.

In some embodiments, a multilayer optical film 100 includes a first multilayer stack (layer 111 with group of layers 124), a second multilayer stack (layer 112 with group of layers 126), and a third multilayer stack (group of layers 128) disposed therebetween. Each of the first, second, and third multilayer stacks include a plurality of polymeric layers. In some embodiments, a total number of polymeric layers in each of the first and second multilayer stacks is at least 50, or at least 100, or at least 150, or at least 200. In some embodiments, a total number of polymeric layers in the third multilayer stack is at least 3, or at least 4, or at least 5, and, in some embodiments, no more than 30, or no more than 25, or no more than 20, or no more than 15, or no more than 12, or no more than 10. In some embodiments, each polymeric layer in the third multilayer stack has a thickness less than 400 nm, or less than 300 nm, or less than 250 nm. Each of the first and second multilayer stacks, and optionally the third multilayer stack, may be optical stacks including a plurality of optical repeat units as described elsewhere. The first and second multilayer stacks include respective first and second polymer layers 111 and 112 immediately adjacent the third multilayer stack (group of layers 128). A difference in thickness between the first and second polymeric layers 111 and 112 is less than about 10%. The third multilayer stack includes at least one pair of immediately adjacent polymeric layers (e.g., 124 and 122, or 122 and 119) such that each polymeric layer in the at least one pair has a thickness greater than an average thickness of the first and second polymeric layers by at least about 20%. In some embodiments, each polymeric layer in the at least one pair has a thickness greater than an average thickness of the first and second polymeric layers 111 and 112 by no more than about 500%. In some embodiments, each layer in the third multilayer stack (group of layers 128) has a thickness in a range of 90% to 600% or to 500% or to 400% or 350% of the average thickness of the first and second polymeric layers 111 and 112. In some embodiments, the multilayer optical film is integrally formed and a minimum average peel strength between first and second portions of the multilayer optical film is greater than about 0.4 N/cm, where the first and second portions include at least one polymeric layer of the first and second multilayer stacks, respectively. In some embodiments, the minimum average peel strength is greater than about 0.6 N/cm, or greater than about 0.8 N/cm. In some embodiments, the minimum average peel strength is determined using a substantially 90-degree peel test at a peel speed of about 1.5 m/min, where the minimum average peel strength is the minimum of the peel strength averaged over an averaging time of about 5 seconds.

Figure 9:
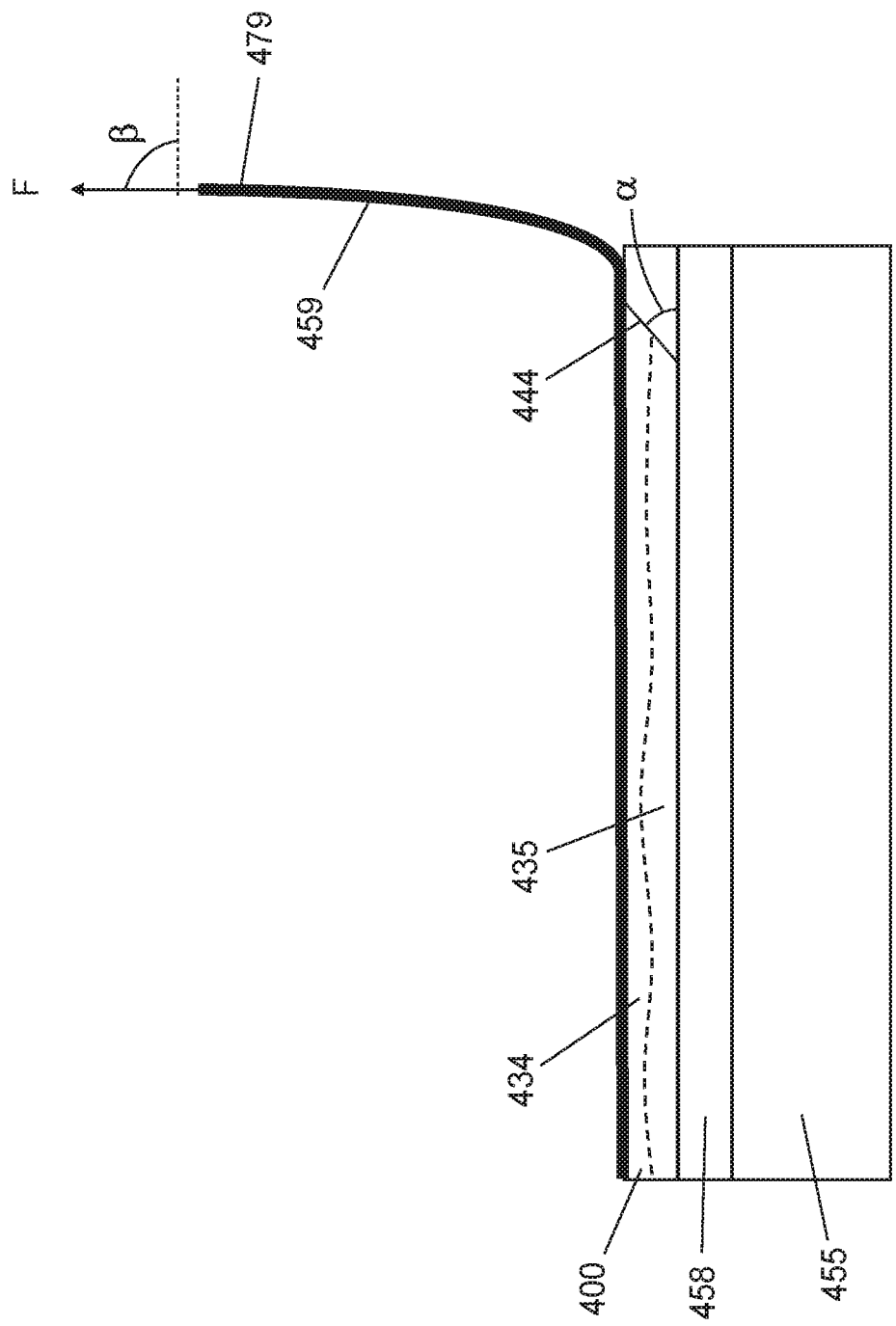
FIG. 9 is a schematic illustration of a peel test.

FIG. 9 schematically illustrates a peel test applied to an integrally formed multilayer optical film 400, which may correspond to optical film 100, for example. The optical film 400 may be cut into a standard size for testing (e.g., 1 inch (2.54 cm) wide by 12 inch (30 cm) strips). Double-sided tape 458 (e.g., 3M 665 Double Sided Tape available from 3M Company, St. Paul, MN) is attached to a plate 455 (e.g., a metal plate) and the film 400 is attached to the double-sided tape 448. The film 400 is scored (e.g., with a razor blade) near an edge of the film along score line 444 which makes an angle α with a major surface of the plate 455 that is in a range of 20 to 60 degrees, or 30 to 45 degrees, for example. A tape 459 is applied to the film 400 such that the tape 459 covers at least the scored portion of the film 400 and such that a free end 479 of the tape 459 is available for peel testing. For example, the tape 459 may be an approximately 1.5 in (4 cm) strip of 3M 396 tape available from 3M Company, St. Paul, MN The free end 479 used for gripping during peel testing may be folded onto itself to form a non-sticky tab (e.g., an approximately ½ inch (1.3 cm) tab). A substantially 90-degree peel test is then be performed by peeling from the free end 479. For example, the angle β between the pull direction (schematically illustrated by the applied force F in FIG. 9) and a direction parallel to a top surface of the plate 455 may be about 90 degrees. The peel test is carried out with a peel speed (speed of the free end 479 along the pull direction) in a range of about 1.2 to about 1.8 m/min (e.g. about 1.5 m/min). The peel test can be performed using an IMASS SP-2000 peel tester (IMASS Inc., Accord, MA), for example. The peel strength is averaged over an averaging time of about 4 to about 6 seconds (e.g., about 5 seconds). The average peel strength can be determined for a single averaging time for each one of multiple samples (e.g., five film samples), or for multiple intervals of the averaging time for a single (e.g., longer) sample. The minimum of these average peel strengths is referred to as the minimum average peel strength.

The peel strength is between two portions 434 and 435 of the optical film 400 where each of the two portions 434, 435 includes at least one layer of the multilayer optical film 400 (e.g., one of the outermost polymeric layers of the film). For example, during the peel test, the optical film 400 may delaminate at an interface between one of the outermost layers and an adjacent layer so that one of the two portions 434, 435 includes the delaminated outermost layer and the other of the two portions 434, 435 include the remainder of the optical film 400. As another example, the optical film 400 may delaminate between first and second optical stacks. For example, when a conventional thick PBL layer is included between the first and second optical stacks, the peeling can occur through the bulk of this layer or at an interface between this layer and an adjacent layer. According to some embodiments, this failure mode is eliminated or substantially reduced by including a multiple, thinner PBLs between the first and second optical stacks. As another example, the optical film 400 may delaminate at an interface between two internal layers within one of the optical stacks. As still another example, the delamination may start at an interface between an outermost layer and an adjacent layer and then propagate into the internal layers of the optical film 400 so that each portion 434 and 435 comprise portions of an internal layer.

In some embodiments, the multilayer optical film includes a plurality of alternating high and low index layers. In some embodiments, the low index layers are formed from a blend of polycarbonate, PETG (a copolyester of polyethylene terephthalate (PET) with cyclohexane dimethanol used as a glycol modifier; available from Eastman Chemicals, Knoxville, TN) and PCTG (a copolyester of PET with twice the amount of cyclohexane dimethanol used as a glycol modifier compared to PETG; available from Eastman Chemicals, Knoxville, TN). The proportion of polycarbonate used can be selected to give a desired glass transition temperature. In some embodiments, the glass transition temperature may be selected to improve microwrinkling of the optical film as described further in co-owned Prov. Pat. Appl. No. 62/851991 filed May 23, 2019 and titled "OPTICAL FILM AND OPTICAL STACK". In some embodiments, the high index layers are formed from polyethylene naphthalate (PEN) or a PEN/polyethylene terephthalate (PET) copolymer. Other polymeric materials known to be useful in polymeric multilayer optical films may alternatively be used.

EXAMPLES

Peel Strength Test Method

Film samples were prepared and cut into 1 inch (2.54 cm) wide by 12 inch (30 cm) strips. Double sided tape (3M 665 Double Sided Tape available from 3M Company, St. Paul, MN) was attached to a metal plate and a sample strip was attached to the double sided tape. The excess film was cut from one end of the plate so that the film was flush with that edge of the plate while the other edge was scored by cutting at a sharp angle with a razor blade. One end of an approximately 1.5 in (4 cm) strip of tape (3M 396 tape available from 3M Company, St. Paul, MN) was folded onto itself to form a ½ inch (1.3 cm) non-sticky tab. The other end of the tape was applied to the scored edge of the film sample. A 90-degree peel test was then performed using an IMASS SP-2000 peel tester (IMASS Inc., Accord, MA) with a peel speed of 60 in/min (1.5 m/min) using a 5 second averaging time. Five strips were tested for each film sample. For the results given in the Examples, the minimum value is reported for sake of comparing weakest or lowest force required to delaminate layers from each other.

Example 1

A birefringent reflective polarizer optical film was prepared as follows. Two multilayer optical packets were co-extruded with each packet comprised of 325 alternating layers of polyethylene naphthalate (PEN) and a low index isotropic layer, which was made with a blend of polycarbonate and copolyesters (PC:coPET) such that the index is about 1.57 and remained substantially isotropic upon uniaxial orientation, where the PC:coPET weight ratio was approximately 41 wt % PC and 59 wt % coPET and has a Tg of 105.8 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC/coPET polymers were fed from separate extruders to a multilayer coextrusion feedblock, in which they were assembled into two packets of 325 alternating optical layers, plus a thicker protective boundary layer of the PC/coPET on the outside of the stacked optical packets, and in between the packets, 9 alternating inner protective boundary layers (see FIG. 2B), which were of optical thickness but were not in coherence, for a total of 661 layers. The multilayer melt was then cast through a film die onto a chill roll, in the conventional manner for polyester films, upon which it was quenched. The cast web was then stretched in a parabolic tenter as described in U.S. Pat. No. 6,916,440 (Jackson et al.) at approximately a 6:1 ratio in the transverse direction at a temperature of 320° F.

Figure 10:
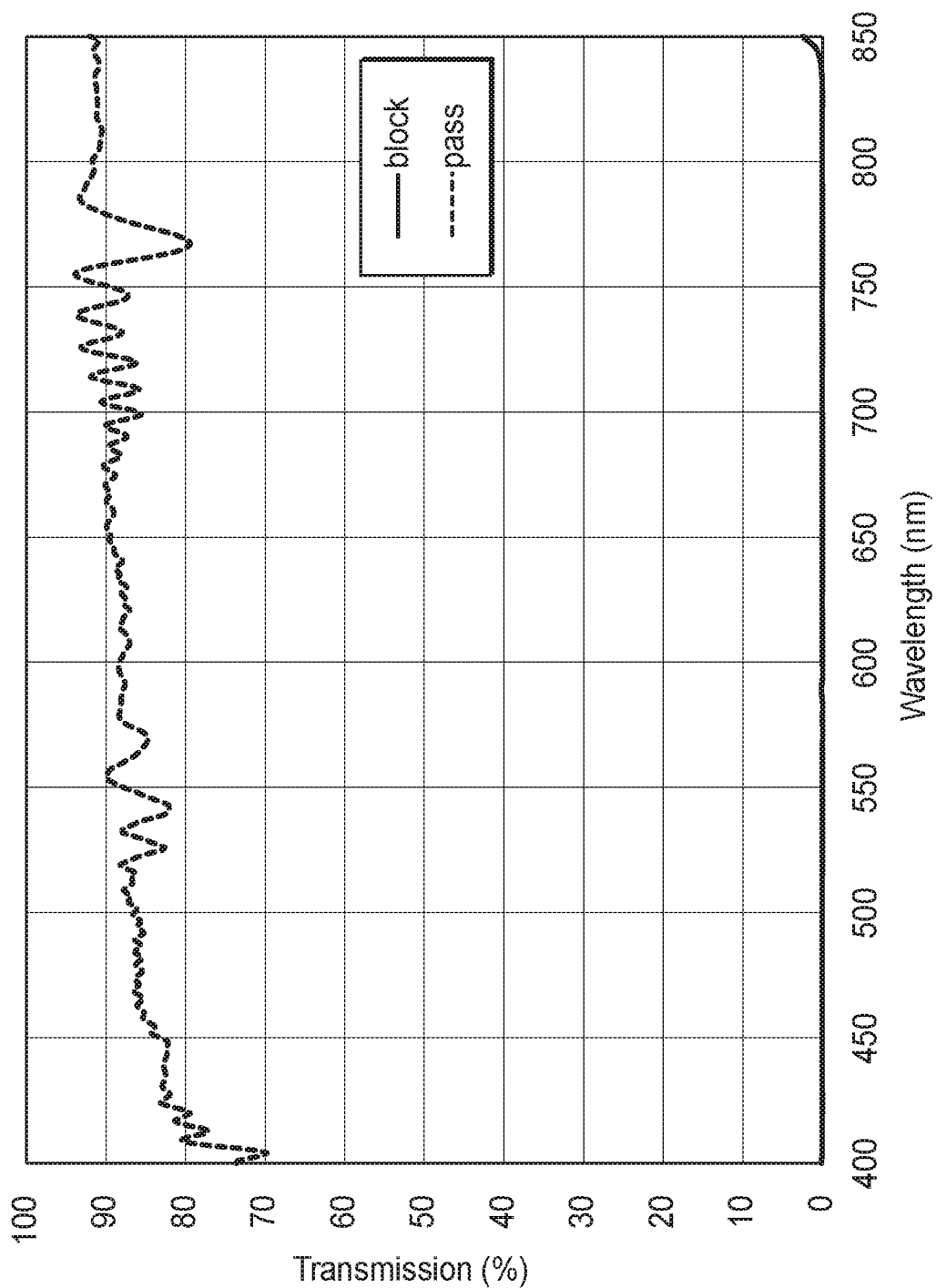
FIG. 10 is a plot of transmission versus wavelength for a reflective polarizer having the layer thickness distribution shown in FIGS. 2A-2B.

The layer thickness profile for the optical film of Example 1 is shown in FIGS. 2A-2B. The outermost protective boundary layers are not included in the plots. The pass and block transmission at normal incidence were determined and are shown in FIG. 10. The average transmission from 450-650 nm for block and pass polarizations was 0.011% and 86.7% respectively. The film of Example 1 had a resulting total thickness as measured by a capacitance gauge of approximately 58.9 μm. The minimum average peel force was 0.991 N/cm.

Example 2

A birefringent reflective polarizer optical film was prepared as follows. Two multilayer optical packets were co-extruded with each packet having of 325 alternating layers of 90/10 coPEN, a polymer composed of 90% polyethylene naphthalate (PEN) and 10% polyethylene terephthalate (PET) and a low index isotropic layer, which was made with a blend of polycarbonate and copolyesters (PC:coPET) such that the index was about 1.57 and remained substantially isotropic upon uniaxial orientation, where the PC:coPET weight ratio was approximately 61 wt % PC and 39 wt % coPET and had a Tg of 116.4 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC/coPET polymers were fed from separate extruders to a multilayer coextrusion feedblock, in which they were assembled into two packets of 325 alternating optical layers, plus a thicker protective boundary layer of the PC/coPET on the outsides of the stacked optical packets, and in between the packets, 9 alternating inner protective boundary layers (see FIG. 11B), which were of optical thickness but were not in coherence, for a total of 661 layers. The multilayer melt was then cast through a film die onto a chill roll, in the conventional manner for polyester films, upon which it was quenched. The cast web was then stretched in a parabolic tenter as described in U.S. Pat. No. 6,916,440 (Jackson et al.) at approximately a 6:1 ratio in the transverse direction at a temperature of 300° F.

Figure 11A:
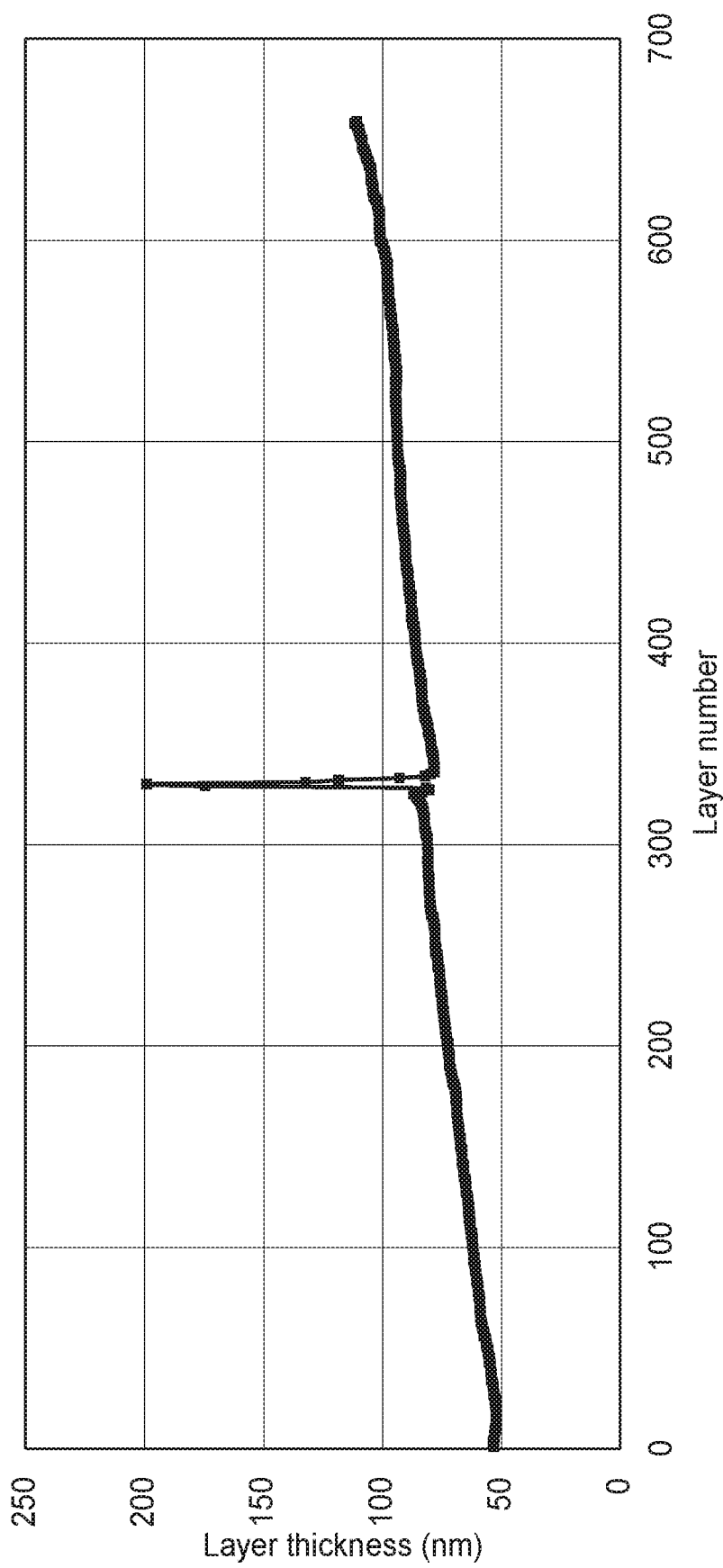
FIG. 11A is a plot of layer thickness versus layer number for a multilayer optical film.
Figure 11B:
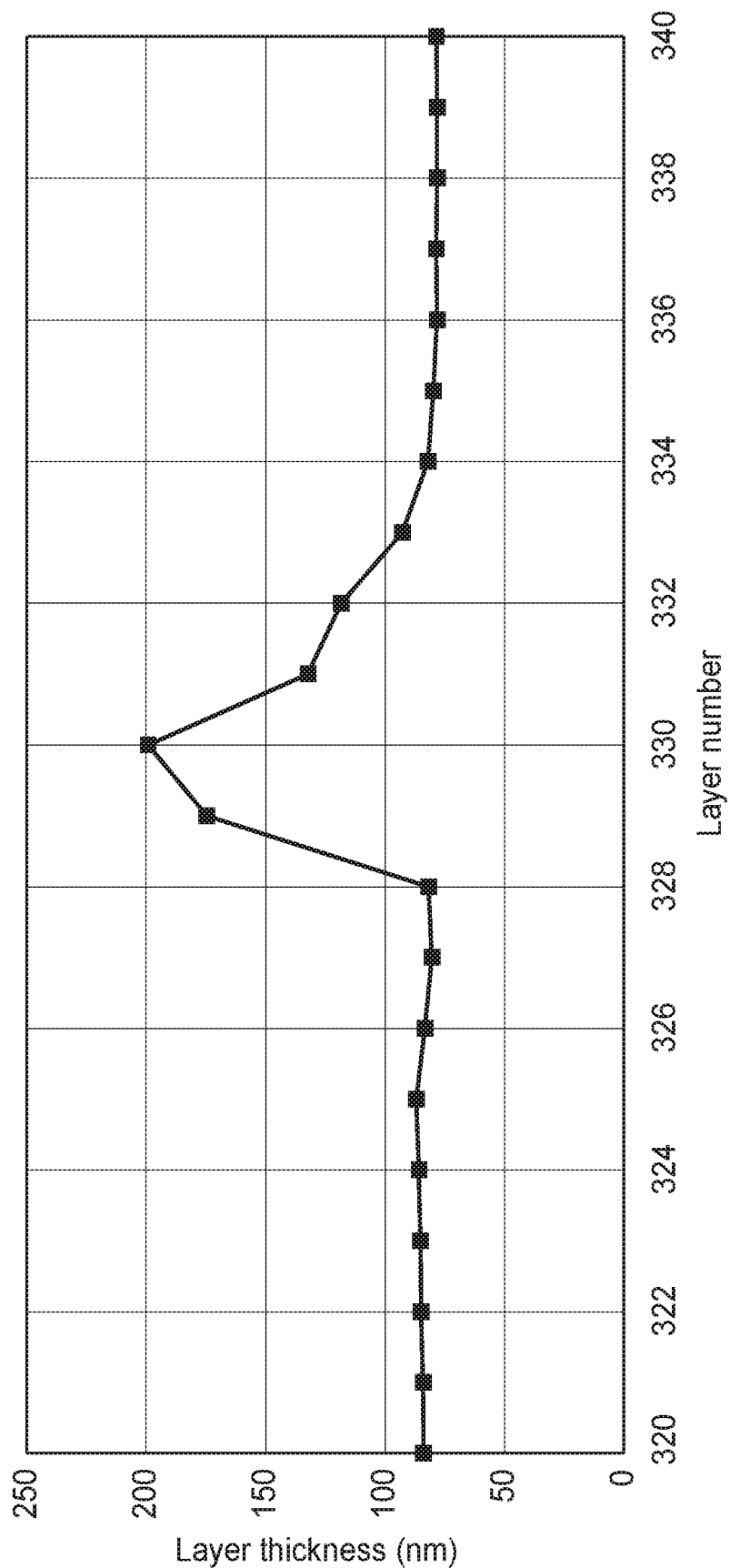
FIG. 11B is an expanded view of a portion of the plot of FIG. 11A.
Figure 12:
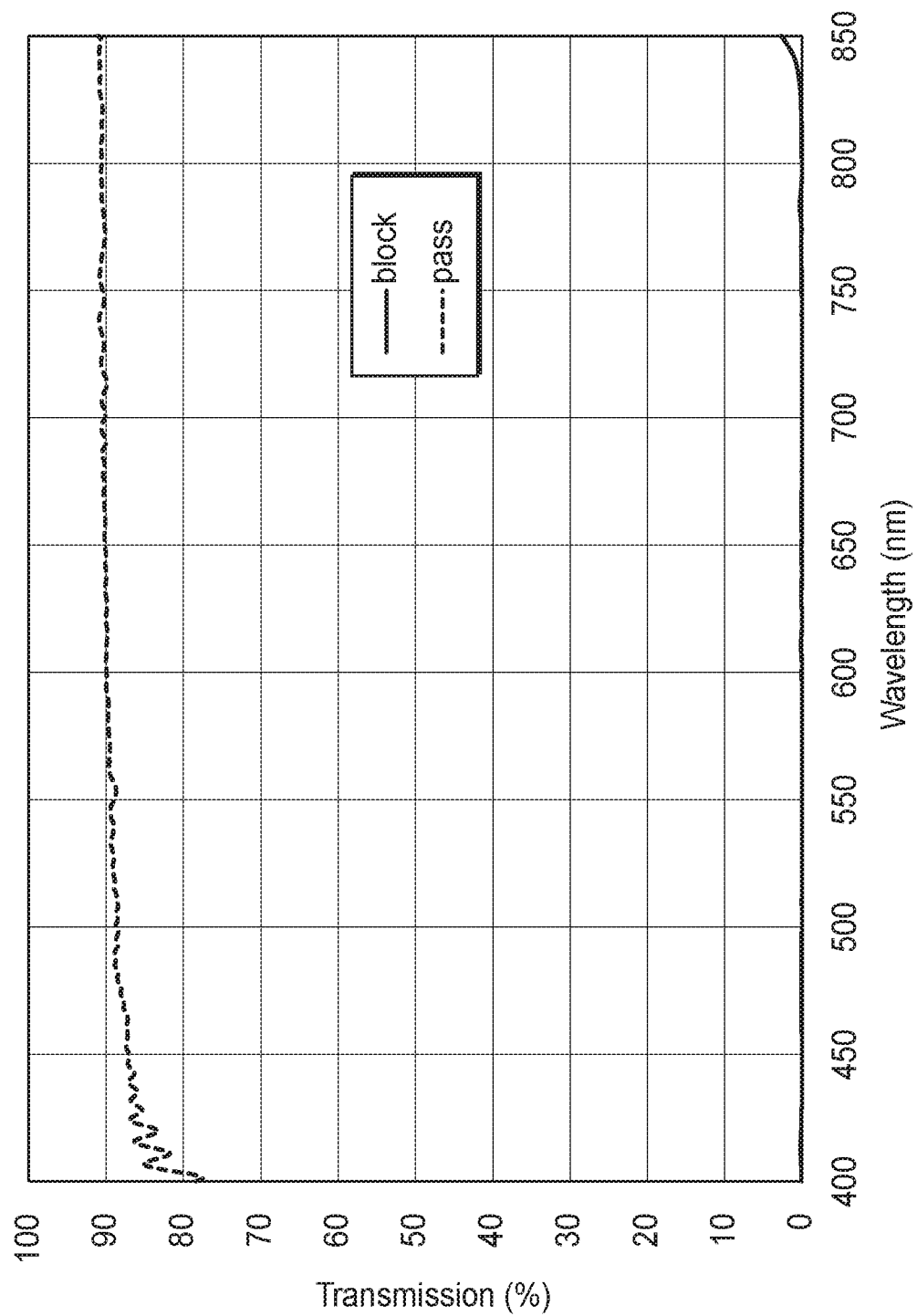
FIG. 12 is a plot of transmission versus wavelength for a reflective polarizer having the layer thickness distribution shown in FIGS. 11A-11B.

The layer thickness profile for the optical film of Example 2 is shown in FIGS. 11A-11B. The outermost protective boundary layers are not included in the plots. The pass and block transmission at normal incidence were determined and are shown in FIG. 12. The average transmission from 450-650 nm for block and pass polarizations was 0.021% and 89.2% respectively. The film of Example 2 had a resulting total thickness as measured by a capacitance gauge of approximately 58.7 μm. The minimum average peel force was 0.876 N/cm.

Comparative Example C1

A birefringent reflective polarizer optical film was prepared as follows. Two multilayer optical packets were co-extruded with each packet having 325 alternating layers of polyethylene naphthalate (PEN) and a low index isotropic layer, which was made with a blend of polycarbonate and copolyesters (PC:coPET) such that the index is about 1.57 and remained substantially isotropic upon uniaxial orientation, where the PC:coPET weight ratio was approximately 41 wt % PC and 59 wt % coPET and has a Tg of 105.8 degrees centigrade. This isotropic material was chosen such that after stretching its refractive indices in the two non-stretch directions remains substantially matched with those of the birefringent material in the non-stretching direction while in the stretching direction there is a substantial mismatch in refractive indices between birefringent and non-birefringent layers. The PEN and PC/coPET polymers were fed from separate extruders to a multilayer coextrusion feedblock, in which they were assembled into two packets of 325 alternating optical layers, plus a thicker protective boundary layer of the PC/coPET on the outside of the stacked optical packets and a thicker protective boundary layer of the PC/coPET between the optical packets, for a total of 653 layers. The multilayer melt was then cast through a film die onto a chill roll, in the conventional manner for polyester films, upon which it was quenched. The cast web was then stretched in a parabolic tenter as described in U.S. Pat. No. 6,916,440 (Jackson et al.) at approximately a 6:1 ratio in the transverse direction at a temperature of 327° F.

Figure 13:
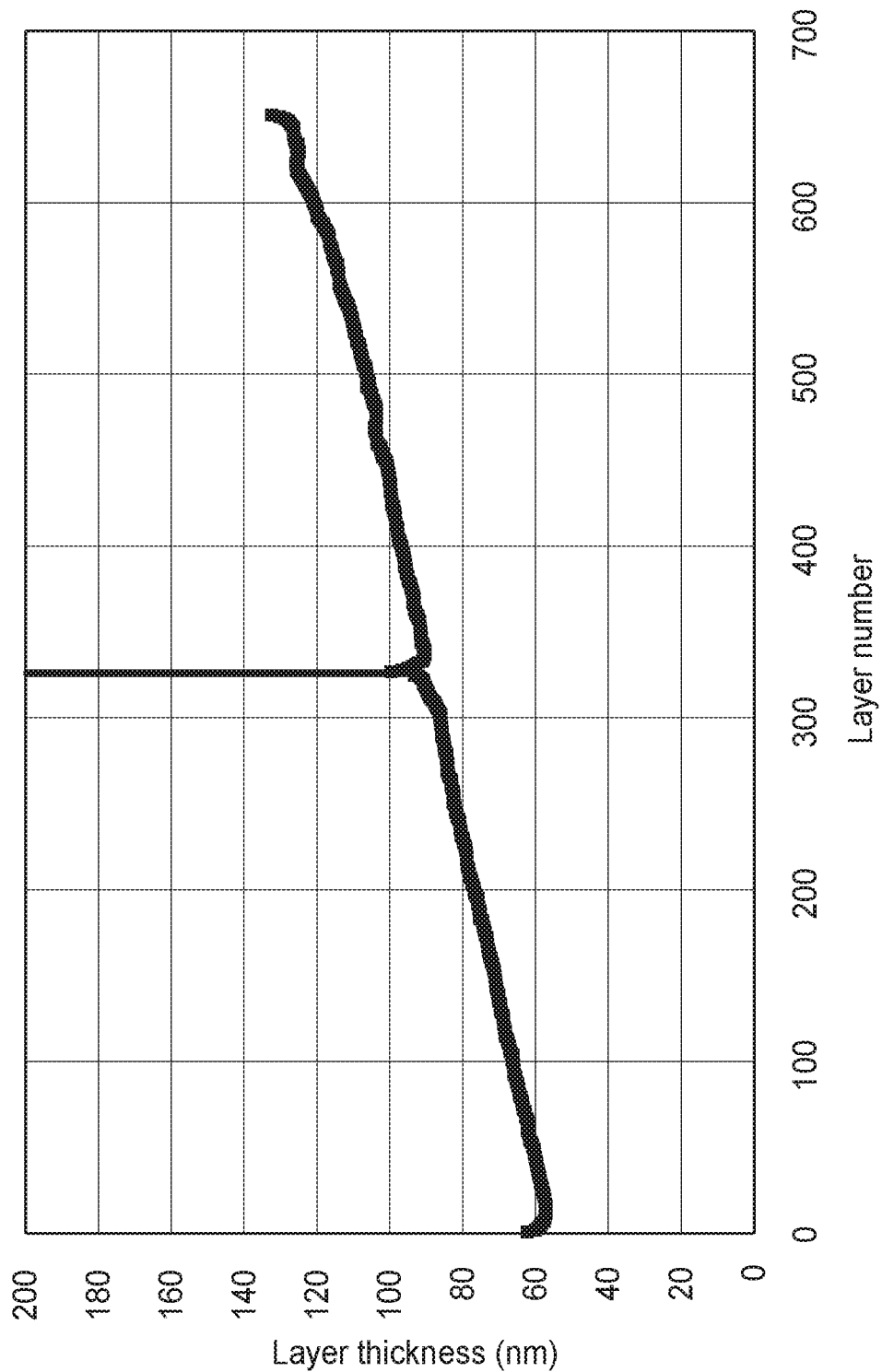
FIG. 13 is a plot of layer thickness versus layer number for a multilayer optical film including a thick spacer layer between optical packets.

The layer thickness profile for the optical film of Comparative Example C1 is shown in FIG. 13. The outermost protective boundary layers are not included in the plot. The center protective boundary layer thickness was 5 μm. The average transmission from 450-650 nm for pass and block polarizations was 0.009% and 88.49% respectively. The film of Comparative Example C1 had a resulting total thickness as measured by a capacitance gauge of approximately 64.9 μm. The minimum peel force throughout the entire film was found in between the packets and measured 0.12 N/cm.

Example 3

A birefringent reflective polarizer optical film was prepared as follows. Two multilayer optical packets were co-extruded with each packet comprised of 325 alternating layers of polyethylene naphthalate (PEN) and a low index isotropic layer, which was made with a blend of polycarbonate and copolyesters (PC:coPET) such that the index is about 1.57 and remained substantially isotropic upon uniaxial orientation, where the PC:coPET weight ratio was approximately 41 wt % PC and 59 wt % coPET and has a Tg of 105.8 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC/coPET polymers were fed from separate extruders to a multilayer coextrusion feedblock, in which they were assembled into two packets of 325 alternating optical layers, plus a thicker protective boundary layer of the PC/coPET, on the outside of the stacked optical packets, and in between the packets, 9 alternating inner protective boundary layers of optical thickness but not in coherence, for a total of 661 layers. The multilayer melt was then cast through a film die onto a chill roll, in the conventional manner for polyester films, upon which it was quenched. The cast web was then stretched in a parabolic tenter as described in U.S. Pat. No. 6,916,440 (Jackson et al.) at approximately a 6:1 ratio in the transverse direction at a temperature of 319° F.

Figure 14A:
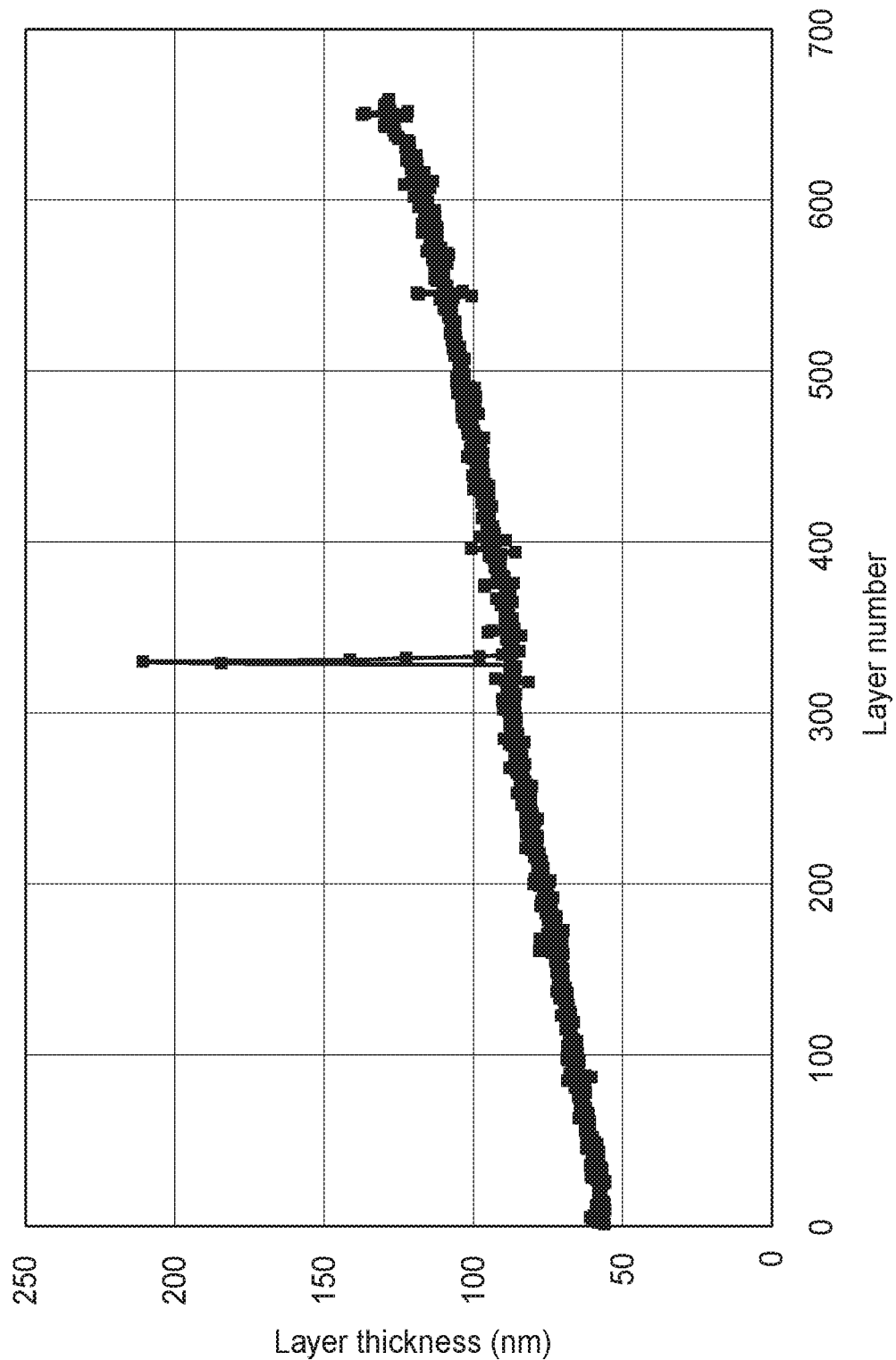
FIG. 14A is a plot of layer thickness versus layer number for a multilayer optical film.
Figure 14B:
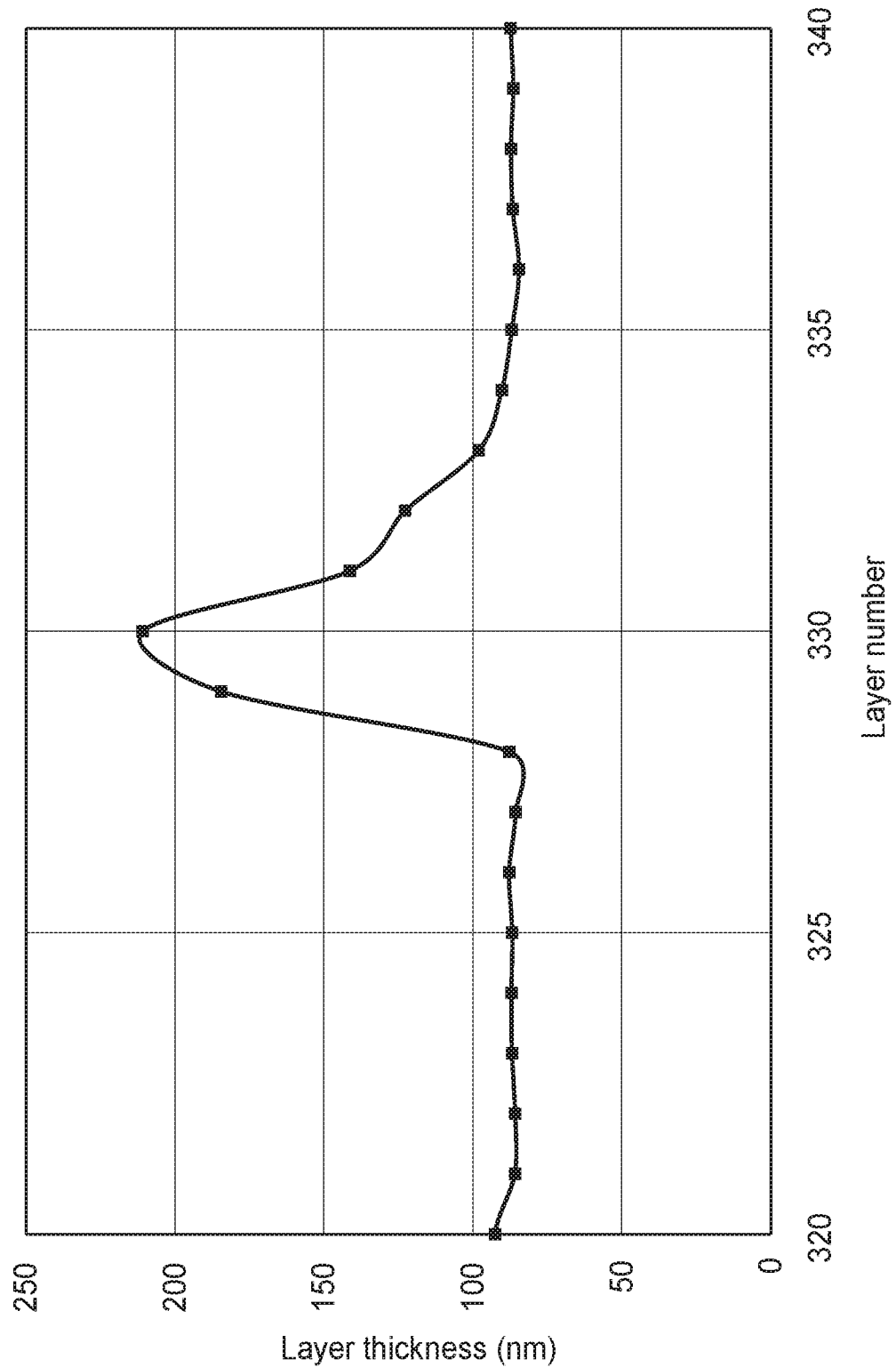
FIG. 14B is an expanded view of a portion of the plot of FIG. 14A.

The layer thickness profile for the optical film of Example 1 is shown in FIGS. 14A-14B. The outermost protective boundary layers are not included in the plots. The average transmission from 450-650 nm for pass and block polarizations was 0.016% and 88.89% respectively. The film of Example 3 had a resulting total thickness as measured by a capacitance gauge of approximately 61.4 µm. The minimum peel force throughout the entire film was found near the outer layers and was 0.81 N/cm.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:

1. A multilayer optical film comprising a plurality of polymeric layers arranged sequentially immediately adjacent to each other, a difference in thickness between spaced apart first and second polymeric layers in the plurality of polymeric layers less than about 10%, the first and second polymeric layers and each polymeric layer disposed between the first and second polymeric layers having a thickness less than about 400 nm, each layer in a group of at least three polymeric layers in the plurality of polymeric layers that are disposed between the first and second polymeric layers having a thickness greater than an average thickness of the first and second polymeric layers by about 50% to about 500%, the group of at least three polymeric layers comprising at least one pair of immediately adjacent polymeric layers, wherein a total number of polymeric layers in the plurality of polymeric layers that are disposed between the first and second polymeric layers is no more than 30.

2. The multilayer optical film of claim 1 comprising at least 50 layers.

3. The multilayer optical film of claim 1, wherein the polymeric layers in the group of at least three polymeric layers are arranged sequentially immediately adjacent to each other.

4. The multilayer optical film of claim 1, wherein the group of at least three polymeric layers in the plurality of polymeric layers is a group of at least four polymeric layers in the plurality of polymeric layers.

5. The multilayer optical film of claim 1, wherein the group of at least three polymeric layers has an average thickness that is greater than the average thickness of the first and second polymeric layers by about 150% to about 250%.

6. The multilayer optical film of claim 1, wherein each of the first and second polymeric layers is disposed between the group of at least three polymeric layers and at least 50 other polymeric layers in the plurality of polymeric layers.

7. The multilayer optical film of claim 1, wherein no layer disposed between the first and second polymeric layers has an average thickness that is less than the average thickness of the first and second polymeric layers by more than about 10%.

8. The multilayer optical film of claim 1 comprising a first group of at least 200 polymeric layers arranged sequentially immediately adjacent to each other along at least a portion of a thickness of the multilayer optical film, the first group of polymeric layers comprising the first and second polymeric layers and the group of at least three polymeric layers, each layer in the first group of at least 200 polymeric layers having an average thickness less than about 400 nm.

9. The multilayer optical film of claim 1, wherein the group of at least three polymeric layers comprises less than 20 polymeric layers.

10. The multilayer optical film of claim 1, wherein the total number of polymeric layers in the plurality of polymeric layers that are disposed between the first and second polymeric layers is no more than 20.

11. The multilayer optical film of claim 1, wherein the plurality of polymeric layers comprises a plurality of optical repeat units arranged sequentially immediately adjacent to each other along at least a portion of a thickness of the multilayer optical film, each optical repeat unit comprising at least two layers and having a corresponding bandwidth, the bandwidths of spaced apart first and second optical repeat units in the plurality of optical repeat units overlapping each other, at least a pair of adjacent optical repeat units in the plurality of optical repeat units that are disposed between the first and second optical repeat units having non-overlapping bandwidths, no optical repeat unit disposed between the first and second optical repeat units having a thickness less than an average thickness of the first and second optical repeat units by more than about 10%, each layer in the multilayer optical film disposed between the first and second optical repeat units having an average thickness less than about 400 nm.

12. The multilayer optical film of claim 11, wherein each optical repeat unit comprises at least four layers.

13. The multilayer optical film of claim 11, wherein each optical repeat unit comprises layers A, B, and C arranged in an order ABCB, wherein layers AB and CB have an optical thickness of a quarter of substantially a same wavelength.

14. The multilayer optical film of claim 1, wherein the plurality of polymeric layers comprises a plurality of alternating layers of first and second optical layers arranged sequentially immediately adjacent to each other, at least first through fourth sequentially arranged adjacent layers in the plurality of alternating layers of the first and second optical layers having intended average thicknesses t1 through t4, respectively, each of t1 through t4 being less than about 400 nm, wherein one of t2 and t3 is greater than t1, t4 and the other one of t2 and t3 by at least 5%.

15. A multilayer optical film comprising a first multilayer stack, a second multilayer stack, and a third multilayer stack disposed therebetween, each of the first, second, and third multilayer stacks comprising a plurality of polymeric layers, a total number of polymeric layers in each of the first and second multilayer stacks being at least 50, the first and second multilayer stacks comprising respective first and second polymer layers immediately adjacent the third multilayer stack, a difference in thickness between the first and second polymeric layers being less than about 10%, a total number of polymeric layers of the multilayer optical film disposed between the first and second polymeric layers being no more than about 30, the third multilayer stack comprising at least one pair of immediately adjacent polymeric layers such that each polymeric layer in the at least one pair has a thickness greater than an average thickness of the first and second polymeric layers by at least about 50%, wherein the multilayer optical film is integrally formed and a minimum average peel force between first and second portions of the multilayer optical film is greater than about 0.4 N/cm, the first and second portions comprising at least one polymeric layer of the first and second multilayer stacks, respectively.

* * * * *